J. A. WELLS.
Band-Saw Guide.

No. 209,368.　　　　　　　Patented Oct. 29, 1878.

Witnesses　　　　　　　　　　　Inventor
Geo. H. Strong.　　　　　　　　Joseph A. Wells
Frank A. Brooks　　　　　　　　By Dewey & Co.
　　　　　　　　　　　　　　　　Attys

UNITED STATES PATENT OFFICE.

JOSEPH A. WELLS, OF OAKLAND, CALIFORNIA.

IMPROVEMENT IN BAND-SAW GUIDES.

Specification forming part of Letters Patent No. 209,368, dated October 29, 1878; application filed August 19, 1878.

*To all whom it may concern:*

Be it known that I, JOSEPH A. WELLS, of Oakland, county of Alameda, and State of California, have invented an Improved Band-Saw Guide; and I do hereby declare the following to be a full, clear, and exact description thereof, reference being had to the accompanying drawings.

My invention relates to an improved guide for band-saws; and my improvements consist in mounting on journals, on a plate which is suitably secured to the guide-stem, a pair of rollers or wheels, between which the saw passes and which serve to guide it, said rollers or wheels being provided with flanges or extended rims at the back, which prevent the saw from being pushed from between the wheels when at work. The rollers or wheels are so arranged as to be adjustable to saws of varying thicknesses or widths.

Figure 1:
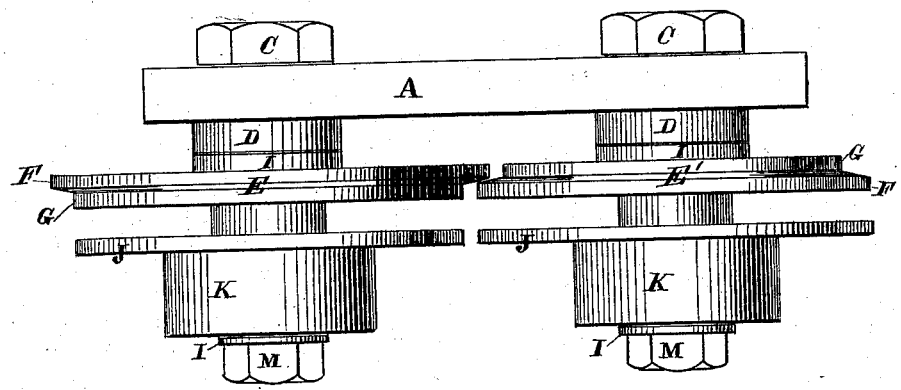
Figure 2:
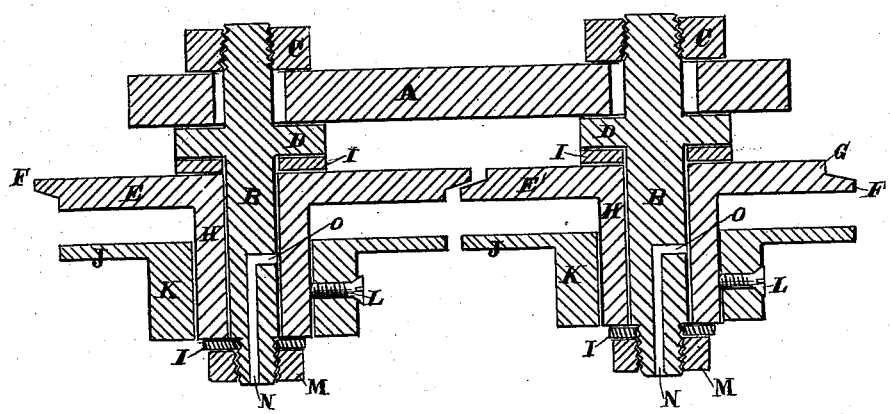

Referring to the accompanying drawings, Figure 1 is a view of my device. Fig. 2 is a section.

Let A represent the back-plate by which the guide is attached to the guide-stem. Passing through this back-plate, on each side, is the bolt or spindle B, having a nut, C, on the back of the back-plate and a shoulder, D, in front of the back-plate. Mounted on each of these bolts B, in front of the shoulder D, are the wheels or pulleys E E', between the edges of which the saw passes, as hereinafter described. These wheels or pulleys are formed in two parts, as shown in Fig. 2 of the drawings. The rear disk, G, has a flange formed on it, as shown at F, the flange on the rear disk of the wheel E being on one side of the disk, and the flange on the rear disk of the wheel E' being on the other side. By this means, when the wheels are mounted on their respective journals, the flanges F overlap or pass by each other, as shown, so that the back of the saw will impinge on the flange as the wheels revolve and be prevented from getting out from between the guide. The rear disk, G, of each wheel is attached to or formed on a sleeve, H, which sleeve fits over the bolts or shafts B, entirely covering said bolts or shafts from the shoulder D, in front of the back-plate, to the threaded portion of the bolt B, where the nut is secured. Washers I are placed on the bolt or shaft at each end of the sleeve H, as shown. The front disk, J, of each wheel is attached to or formed on a collar, K, which collar slips over the sleeve H and is secured firmly to said sleeve by means of the set-screw L. Nuts M are then screwed on the end of the bolt or shaft, thus securing the wheels or pulleys on said bolts or shafts. Holes N are bored lengthwise of the bolts or shafts for a short distance and there meet other holes O, so that the lubricants may be admitted between the collar and shaft through said holes.

The slots in the back-plate, through which the bolts or shafts project, are extended each way, so that said bolts or spindles may be moved laterally in either direction and again secured by the nuts. By this means the pulleys or wheels on the spindle may be adjusted as far apart as necessary to allow any required thickness of saw to pass between them. For thin saws they may be set close together, and for thick ones farther apart. It will be evident that this adjustment of the spindles may be accomplished by other means—for instance, by a set-screw passing laterally through or behind the back-plate and attached to the end of the spindle.

The width of the face of the wheels may be also increased, so as to suit saws of various widths. The rear flanged disks, G, of each wheel remain in the same relative position on the spindle, but the front disk, J, of each wheel may be altered in its position with relation to the rear disk. This is done by loosening the set-screw in the collar of the front disk and sliding this collar back or forth in the sleeve, thus increasing or decreasing the distance between the two disks. When in the proper position the set-screws may be tightened again, thus securing the front disk by means of its collar on the sleeve, so that it will revolve as part of the wheel or pulley. In this way the rims of the two disks on each wheel form a face, on which the sides of the saw impinge while the wheels revolve, the flanges on the rear disks taking the rear edge of the saw-blade at the same time.

For a very wide saw-blade the front disk may be reversed, so that the collar may be screwed onto the sleeve and the front disk will project over the front end of the spindle. This will bring the two disks a wide distance apart, and, if considered necessary, a supplementary wooden or metal disk may be placed between the two on each spindle. The wide saws, however, are proportionately thick, so that the faces of the two disks, one on each edge of the blade, will be usually sufficient for all practical purposes.

By the use of this device the friction on guides for band-saws is reduced to a minimum, and it is easily adjustable for various widths and thicknesses of saws. One of these guides may be secured to the guide-stem, and another placed under the saw-table in the usual way. These guides may be used on the stems of any of the band sawing-machines now in use, appropriate means being provided for securing them to the stems. It will be seen from the construction described that the pulleys forming this guide may be adjusted to a nicety to suit saws of varying sizes. The peculiar formation of the pulleys, with their rear flanged disks, is such as to render it impossible for the saw to get out from its proper position between the wheels. Pressure on the cutting-edge of the saw, even in the case of sawing heavy blocks, does not materially increase the running friction, since, instead of the rear edge of the saw pushing against a solid piece of metal firmly fixed, it impinges on a surface revolving in the direction of its line of travel at an exactly proportionate rate of speed. Moreover, this flange, from the peculiar construction of the rear disks of the wheels, is always in position to take the rear edge of the saw, whether the pulleys are close together or far apart enough to take the thickest saw-blade.

The friction on the sides of the blade is merely nominal, since the surfaces on which they impinge are running on the same line of travel and at a rate of speed exactly corresponding to that of the blade.

Having thus described my invention, what I claim as new, and desire to secure by Letters Patent, is—

1. The sets of disks or rollers E E', mounted upon parallel spindles B, so that the outer disks, J, may be adjusted to or from the rear disks, G, to fit and guide different widths of saw-blades, substantially as herein described.

2. The disks G, with their projecting hubs H, rotating upon the spindles B, in combination with the disks J, with the hub K fitted and secured to the inner hubs, so as to be adjustable or reversed upon them, substantially as and for the purpose herein described.

3. The two sets of disks G J, mounted upon parallel spindles, so as to guide the saw, as shown, the rear disks, G, being formed with overlapping flanges F, substantially as and for the purpose herein described.

4. The two sets of rollers E E', rotating upon the parallel spindles B and guiding the saw-blade, as shown, the spindles being laterally adjustable in the plate A, to admit varying thicknesses of saw-blades, substantially as herein described.

5. A guide and support for band-saws consisting of the rollers mounted upon parallel spindles, so as to be adjustable laterally and also forward and back, to fit the saw and relieve friction, substantially as herein described.

In witness whereof I hereunto set my hand.

JOSEPH A. WELLS.

Witnesses:
  CHAS. G. YALE,
  FRANK A. BROOKS.